Patented Oct. 4, 1949

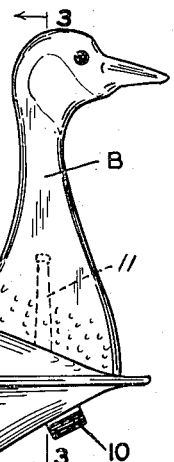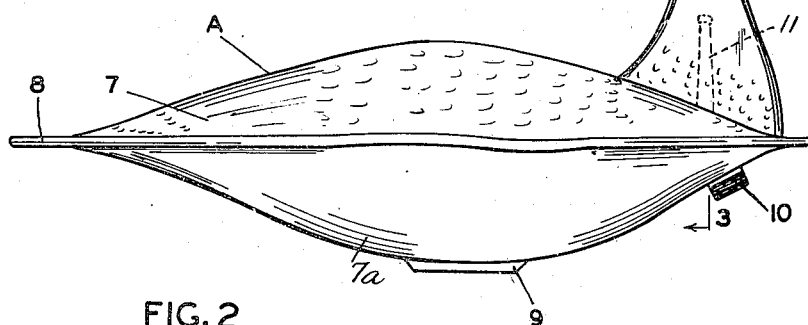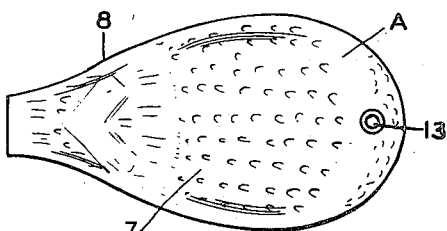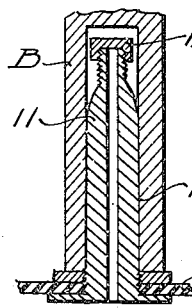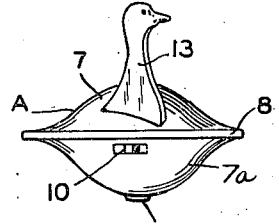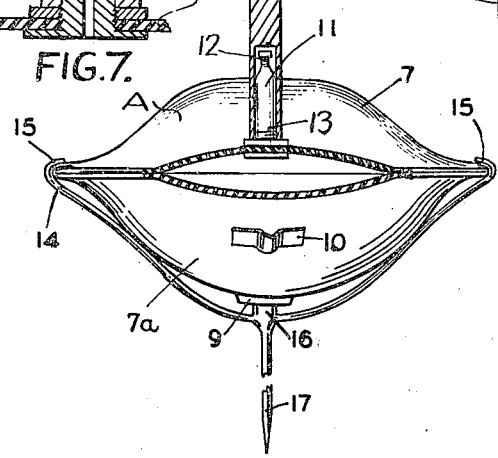

2,483,680

UNITED STATES PATENT OFFICE 2,483,680

DECOY

Raymond L. Timm and Louis L. Hartshorn,
Minneapolis, Minn.

Application July 17, 1946, Serial No. 684,354

3 Claims. (Cl. 43—3)

This invention relates to water bird decoys and particularly to goose decoys.

It is one of the objects of the invention to provide a novel and improved water bird decoy of light weight, collapsible construction and capable of use either in the water or on hand.

Another object is to provide such a decoy including a rubber body which is inflatable and which carries an upstanding stem at one end of the same and a head-and-neck member which has an opening in its lower portion to receive the stem, whereby the head-and-neck member may be turned to different angular positions relative to the body about the stem as a pivot.

A further object is to provide a water bird decoy including a body formed of two concave sheets of rubber, the edges of which are joined together in facing relation to provide substantially a horizontal external flange which acts somewhat in the manner of the sideboards of a sailboat to assist in maintaining the body upright when placed in the water and subjected to rather high winds.

Another object is to provide a novel holder for such a decoy as last above mentioned to readily mount the same on land.

The objects and advantages of the invention will more fully appear from the following description made in connection with the accompanying drawings wherein like reference characters refer to the same or similar parts throughout the various views and in which:

Fig. 1 is a view in side elevation illustrating a goose decoy embodying the present invention.

Fig. 2 is a plan view of the body of the decoy with the head-and-neck piece removed.

Fig. 3 is a vertical section taken on a line 3—3 of Fig. 1 as indicated by the arrows, the decoy being mounted on a wire frame for field use.

Fig. 4 is a view in front elevation of the decoy showing the head turned to a somewhat different position than is shown in Fig. 1.

Fig. 5 is a bottom view of the decoy;

Fig. 6 is a perspective view illustrating the wire frame for field use; and

Fig. 7 is an enlarged sectional detail showing parts illustrated in Fig. 3.

Figs. 1 and 3 of the drawings are on an enlarged scale relative to Figs. 2, 4, 5, and 6 and Fig. 7 is enlarged relative to Figs. 1 and 3.

In accordance with the invention a body A is formed to represent a body of a water bird, such as a goose. This body A consists of two sheets 7 and 7a of natural or artificial rubber of concave formation, the two concave sides facing each other and the edges of the two sheets being vulcanized or cemented together to form a rather wide, continuous, substantially horizontal flange 8 around the entire body. In producing the two sheets 7 and 7a for making the body, we may employ sections cut from heavy automotive tire inner tubes, such as those tubes employed in truck tires inasmuch as such sheets are of about the right consistency and have a natural curvature which corresponds when the sheets are cut properly to the natural curvature of the body of a wild goose. Vulcanized, glued, or otherwise attached to the lower sheet 7a of the body at a point slightly forward of the center of the same, is a weight 9 forming a keel for the body, this weight being preferably of lead or other heavy material. Also applied to the forward part of the lower body sheet 7a is a channeled strap 10 formed of rubber or other flexible material, whereby a line carrying an anchoring weight may be attached to the body of the decoy.

Applied to the top side of the forward portion of the top sheet 7 of body A is a deformable stem 11, which carries a cap 12 and stands up from the body. This valve stem is preferably of the type employed in truck tires and is made of lead or other bendable material so that the angulation of the upstanding portion of the stem can be varied relative to the body A. A combined head-and-neck piece B shaped to represent the head and neck of a wild water bird, such as a goose, is provided and the base of this head-and-neck piece is shaped to conform generally to the curvature of the upper forward portion of the sheet 7 of body A, and an opening 13 is cut in the lower part of the head-and-neck piece to receive the stem 11. The stem 11 will rather tightly fit the opening 13, but the head-and-neck piece B can be turned about the stem as a pivot so as to set the head-and-neck piece at different angles relative to the stem 11. Also by deforming the stem 11, the head-and-neck piece can be turned laterally as desired to represent the goose or other water bird in different natural positions. The head-and-neck piece B will preferably be made of light weight material, such as light wood.

The head-and-neck piece B and the body A will preferably be painted to conform to the natural plumage of the wild bird that the decoy is to represent.

For field use a wire frame C is provided. This wire frame includes a yoke-like cradle 14 adapted to fit below the body A of the decoy to embrace the lower sheet 7a of the body and the cradle is preferably provided with hooks 15 at its ends which hook over opposite portions of the flange 8. The center of the yoke-like cradle 14 has secured thereto a small cross-bar 16, which preferably bears against the weight 9 and projecting downwardly from the center of the cradle is a prong 17, which may be driven into the ground. When the frame C is employed as shown in Fig. 3, the decoy can be set up in the field for field use.

Normally when the decoy is being transported, the air will have been exhausted from the body A by removing the cap 12 and the body will be collapsed, the head-and-neck piece of course being removed from the valve stem 11. The decoy then will take up but small compass and can be readily transported from one point to another, the weight of the same being very small compared with the ordinary wooden block decoy now extensively in use. When it is desired to set up the decoy for water use, the body will be inflated by mouth or pump applied to the valve stem 11 after the cap 12 is removed, whereupon the cap 12 will be reapplied. It will not be necessary to force very much air into the body to inflate it properly inasmuch as it is not intended that the body A will stretch to any appreciable extent, the natural curved shape of the body allowing sufficient air to be placed therein so that the body will take the natural position of the body of the water bird very readily. The head-and-neck piece B will then be applied to the valve stem 11. If a number of decoys are employed, different decoys may be fixed so that the head-and-neck pieces B take different positions, it being preferable that the head-and-neck pieces be turned slightly from a straightforward position. It is a known fact among goose hunters that, when the geese have their heads straight up and facing forward, they are on the alert, which would tend to prevent other birds from being drawn in to them. It is therefore highly desirable that the head-and-neck pieces B be set to represent the birds when they are feeding and not on the alert. When the decoys are anchored in the water, the head-and-neck piece of a decoy will cause the forward part of the decoy to ride somewhat below the level of the rear portions of the decoy in much the same manner as a goose or duck rides on the surface of the water. The side flange 8 acts in conjunction with the keel weight 9 to maintain the decoy in an upright position at all times even when the wind is quite heavy. In other words, the flange 8 will dip into the surface of the water as the body of the decoy tends to tip and the flange will act very much on the order of sideboards of a sailboat to keep the decoy from tipping over. It is found that even though the head-and-neck member B is quite loose on the valve stem 11, it will maintain its position. By distorting the valve stem slightly, however, it can be made to tightly fit into the opening 13 in the lower part of the head-and-neck piece so that the head-and-neck piece can be disengaged from the body only by pulling the pieces apart by pressure.

It is a distinct advantage to make the head-and-neck piece separate from the body A. If the head-and-neck piece were made of rubber and were inflated, it would be extremely difficult to inflate the head-and-neck piece sufficiently to distend the same and give the same a natural appearance without inflating the body to such an extent that it would be misshapen. Also such inflation would make the body too buoyant so that the decoy would tend to lie on its side and bob around unnaturally.

Decoys of the present type made up as goose decoys have been successfully used on the water as well as in the field for attracting wild birds during actual hunting conditions.

It will of course be understood that various changes may be made in the form, details, arrangement, and proportions of the various parts without departure from the scope of the present invention which, generally stated, consists in the matter shown and described and set forth in the appended claims.

We claim:

1. A light weight, collapsible bird decoy comprising an inflatable rubber body, an upwardly projecting stem at the forward upper end of said body and a head-and-neck piece having an opening in its lower portion receiving said stem and turnable to different positions relative to said body about said stem as a pivot.

2. A light weight, collapsible bird decoy comprising an inflatable rubber body, an upwardly projecting deformable stem at the forward upper end of said body, said stem being deformable to project at different angles in a general upward direction from the body and a head-and-neck piece having an opening in its lower portion receiving said stem and turnable to different positions relative to said body about said stem as a pivot.

3. A light weight collapsible bird decoy comprising a body formed of but two concave rubber sheets, said sheets having their concave sides facing each other and being vulcanized together around their edges to form a substantially horizontal flange tending to keep the body upright when on the water during high winds, a stem mounted in the forward portion of the upper side of said body, a head-and-neck member having an opening in its lower portion within which said stem is received and capable of being turned about said stem as a pivot to take different angles relative to said body, and a keel weight carried by the lower portion of said body.

RAYMOND L. TIMM.
LOUIS L. HARTSHORN.

REFERENCES CITED

The following references are of record in the file of this patent:

UNITED STATES PATENTS

| Number | Name | Date |
| --- | --- | --- |
| 349,315 | Nye | Sept. 21, 1886 |
| 358,688 | Nassauer | Mar. 1, 1887 |
| 395,612 | Curlin | Jan. 1, 1889 |
| 747,732 | Kremer | Dec. 22, 1903 |
| 849,367 | Burke | Apr. 9, 1907 |
| 1,469,613 | Baily | Oct. 2, 1923 |
| 2,134,891 | Reinhart | Nov. 1, 1938 |
| 2,331,421 | Redhead | Oct. 12, 1943 |

Certificate of Correction

Patent No. 2,483,680 October 4, 1949

RAYMOND L. TIMM ET AL.

It is hereby certified that errors appear in the printed specification of the above numbered patent requiring correction as follows:

Column 1, line 6, for the word "hand" read *land*; column 2, line 25, and column 3, lines 14, 21, 58, and 60, strike out "valve";

and that the said Letters Patent should be read with these corrections therein that the same may conform to the record of the case in the Patent Office.

Signed and sealed this 28th day of February, A. D. 1950.

[SEAL]

THOMAS F. MURPHY,
*Assistant Commissioner of Patents.*